(12) United States Patent
Mukai et al.

(10) Patent No.: US 8,300,279 B2
(45) Date of Patent: Oct. 30, 2012

(54) IMAGE READING DEVICES

(75) Inventors: Takaaki Mukai, Iwakura (JP);
Yoshinori Osakabe, Seto (JP); Ayako Sakai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 528 days.

(21) Appl. No.: 12/410,450

(22) Filed: Mar. 24, 2009

(65) Prior Publication Data
US 2009/0244655 A1    Oct. 1, 2009

(30) Foreign Application Priority Data

Mar. 31, 2008   (JP) .................................. 2008-089377

(51) Int. Cl.
| | |
|---|---|
| H04N 1/04 | (2006.01) |
| H04N 1/21 | (2006.01) |
| G06F 3/12 | (2006.01) |
| H01L 27/00 | (2006.01) |
| H01L 23/62 | (2006.01) |
| H01R 13/62 | (2006.01) |
| H03K 17/00 | (2006.01) |
| F16M 11/00 | (2006.01) |
| G03G 15/00 | (2006.01) |
| B41J 2/175 | (2006.01) |
| H05K 9/00 | (2006.01) |

(52) U.S. Cl. ........ 358/474; 358/497; 358/471; 358/494; 358/296; 358/493; 358/1.13; 250/208.1; 439/298; 257/355; 327/365; 248/157; 399/107; 347/85; 174/350

(58) Field of Classification Search .................. 358/474, 358/497; 250/208.1; 439/298; 257/355; 327/365; 702/154; 399/107; 347/85; 147/350
See application file for complete search history.

(56) References Cited

U.S. PATENT DOCUMENTS

| | | | | |
|---|---|---|---|---|
| 5,900,622 | A * | 5/1999 | Ogura et al. | ............... 250/208.1 |
| 7,428,081 | B2 | 9/2008 | Yamauchi | |
| 7,954,932 | B2 * | 6/2011 | Kawamura et al. | ............. 347/85 |
| 2006/0226886 | A1 * | 10/2006 | Yamada et al. | ............... 327/365 |
| 2007/0177226 | A1 * | 8/2007 | Ishida et al. | ................... 358/474 |

FOREIGN PATENT DOCUMENTS

| | | |
|---|---|---|
| JP | H11-064993 A | 3/1999 |
| JP | 2002-218161 A | 8/2002 |
| JP | 2003-233138 A | 8/2003 |
| JP | 2004-104392 A | 4/2004 |
| JP | 2005-057628 A | 3/2005 |
| JP | 2008-017201 A | 1/2008 |

* cited by examiner

*Primary Examiner* — Charlotte M Baker
*Assistant Examiner* — Rury Grisham
(74) *Attorney, Agent, or Firm* — Baker Botts L.L.P.

(57) ABSTRACT

The invention describes an image reading device having a housing, a transparent panel, an image sensor, a carriage, and an electric cable. The housing has a first, second, and third surface. The transparent panel defines a portion of the first surface. The image sensor extends in a first direction, and is mounted to the carriage and optically reads a document through the transparent panel while the carriage reciprocates in a second direction. The electric cable is electrically connected to the image sensor, and includes a band surface portion having a band surface and extending in a third direction intersecting the first and second direction. The electric cable also has a first end portion attached to the carriage; and a second end portion attached to the second surface. At least a portion of the electric cable is twisted such that the band surface and the third surface are not parallel.

17 Claims, 8 Drawing Sheets

IMAGE READING DEVICES

CROSS REFERENCE TO RELATED APPLICATION

The present application claims priority to Japanese Patent Application No. 2008-089377, which was filed on Mar. 31, 2008, the disclosure of which is incorporated herein by reference in its entirety.

BACKGROUND OF THE INVENTION

1. Field of the Invention

The invention relates to image reading devices. In an image reading device, a carriage carrying an image sensor moves in a housing having a transparent panel, and an electric cable extending from the image sensor follows the movement of the carriage while maintaining a curved position.

2. Description of Related Art

A known image reading device, e.g., a flatbed scanner, a housing serves as a scanning table. In the housing, an image sensor such as a charge coupled device ("CCD") or a contact image sensor ("CIS"), which is mounted on a carriage, scans a document in a specified direction so as to read an image of the document. A flatbed scanner may be used as a dedicated scanner or a scanning device incorporated in a copier or a multi-function device.

Electric signals output from the image sensor are transmitted to a control circuit board or the like through an electric cable, e.g., a strap-shaped type cable, which is called a flexible flat cable ("FFC"). An FFC may change shape and follow the movement of the carriage due to its flexibility. The FFC is routed such that the FFC is curved and reversed in the housing. For example, in a known image reading device, the FFC, which extends from an image sensor, is routed such that the FFC is curved from the upper surface toward the lower surface of a housing. With such a structure, a problem occurs in that the FFC, particularly the curved portion of the FFC, contacts the housing or a glass plate on which a document is placed.

In a known image recording device, e.g., a device described in one or more of Japanese Unexamined Patent Application Publications Nos. 2004-104392, 2005-57628, and 2008-17201, an FFC is placed in a recess or a groove in a lower surface structure of a housing, e.g., a scanner housing serving as a base member. With this structure, the FFC is prevented from contacting a glass plate or the housing, even when the housing has a low profile. In a known image recording device, e.g., the device described in Japanese Unexamined Patent Application Publication No. 2003-233138, an FFC is routed from a short side of an image sensor and along its long side. With this structure, an FFC is prevented from contacting a glass plate, e.g., the document table glass. In another known image recording device, e.g., the device described in Japanese Unexamined Patent Application Publication No. 11-64993, an end of an FFC is fixed to a housing obliquely downward. With this structure, the FFC is prevented from contacting a glass plate, e.g., the contact glass. The known image recording device also has a structure in which an end of the FFC is fixed such that the length direction of the FFC can be flexibly changed. With this structure, twisting of an FFC may be reduced.

In yet another known image recording device, e.g., the device described in Japanese Unexamined Patent Application Publication No. 2002-218161, an FFC is routed in a region corresponding to a region of a glass plate, e.g., document table glass, in which size markers are positioned. With this structure, even if the glass plate is smudged or scratched due to sliding contact by the FFC, the quality of a read image may not be adversely affected. In still another known image recording device, e.g., a device described in one or more of Japanese Unexamined Patent Application Publications Nos. 2004-104392, 2005-57628, and 2008-17201, a bottom of the recess or groove is positioned at a sufficient distance from the glass plate, such that the FFC does not contact the glass plate or the like. Thus, in the known image recording device, the lower surface of the housing protrudes by the length corresponding to the depth of the recess or groove, which makes it difficult to make the entire housing low-profile. In a multi-function device in which a device such as a printer is positioned below a scanner, components of the printer are to be arranged such that they do not interfere with the protrusion of the scanner, which may complicate design.

Moreover, in yet another known image recording device, e.g., the device described in Japanese Unexamined Patent Application Publication No. 2003-233138, a reaction force, which is generated by the curved portion of the FFC so as to allow the FFC to return to its original linear shape, is applied to an end of the image sensor in a direction in which the image sensor moves, e.g., a sub-scanning direction, whereby a position of the image sensor may be changed in a rotating manner. The reaction force fluctuates as the shape of the FFC changes while the FFC follows the image sensor. Therefore, during a scanning process with the image sensor, a relationship between the reading direction in a scanning direction, e.g., in the main scanning direction, and the sub-scanning direction changes, thereby deteriorating a quality of a read image.

In a known image recording apparatus, e.g., the image recording apparatus disclosed in Japanese Unexamined Patent Application Publication No. 11-64993, a space is required so as to allow the FFC to extend downward from its end fixed to the housing. That is, the structure requires an enough height inside the housing. With a low-profile housing having an inner space with a small height, however, it is difficult to provide the space for the FFC to extend downward from the end fixed to the housing.

SUMMARY OF THE INVENTION

A technical advantage of the invention is to provide a small and low-profile image reading device in which an electric cable can smoothly change its position without buckling while the electric cable follows a carriage. Another technical advantage is to reduce or prevent deterioration of a read image due to contact between an electric cable and a transparent panel in an image reading device.

In an embodiment of the invention, n image reading device comprises a housing comprising a first surface, a second surface within the housing on an opposite side of the housing from the first surface, and a third surface opposite to the first surface, a transparent panel, wherein the transparent panel defines at least a portion of the first surface of the housing, an image sensor extending in a first direction and configured to optically read a document through the transparent panel, a carriage having the image sensor mounted thereon and configured to reciprocate along the transparent panel in a second direction, wherein the second direction intersects the first direction, and an electric cable electrically connected to the image sensor, the electric cable comprising a band surface portion comprising a band surface, and extending in a third direction, wherein the third direction intersects the first direction and the second direction, a first end portion attached to the carriage, and a second end portion attached to the second surface, wherein at least a portion of the electric cable is twisted such that the band surface and the third surface are not parallel.

DETAILED DESCRIPTION OF EMBODIMENTS OF THE INVENTION

In an embodiment of the invention, the image reading device 10 may be used as a scanner section of a multi-function device ("MFD") having a printing function and a scanning function, or as an image reading section of a copier. However, the image reading device 10 may be implemented in a dedicated scanner such as a flatbed scanner ("FBS"), because functions such as printing are optional in the invention.

Figure 1:
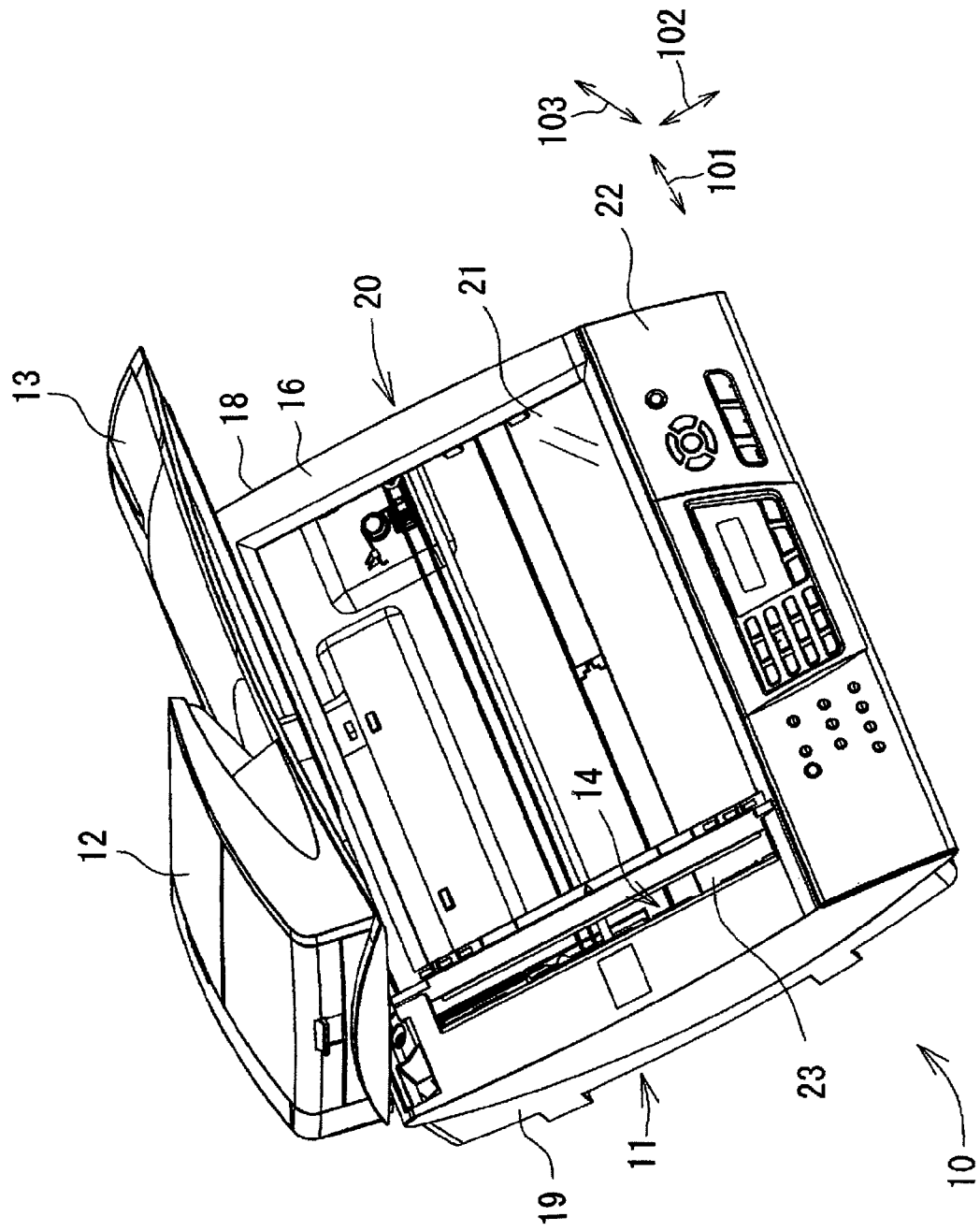
FIG. 1 is a perspective view showing the external structure of an image reading device according to an embodiment of the invention.

As shown in FIG. 1, in an embodiment of the invention, an image reading device 10 may comprise a document table 11 and a document cover 13. Document cover 13 may be attached to document table 11, such that document cover 13 may be opened and closed via a hinge mechanism (not shown) positioned on the back side of document cover 13. Document cover 13 also may comprise an auto document feeder ("ADF") 12.

Document table 11 may comprise a housing 20 having a low-profile hexahedral shape, and a platen glass 21 on top of housing 20. Housing 20 may be substantially hollow and may comprise an image reading unit 14. A first surface, e.g., an upper surface of platen glass 21, on which an object to be read, e.g., a document, is to be placed, may comprise a central part of a top surface 16 of housing 20. Platen glass 21 may be substantially transparent, which may allow light to pass through housing 20 via platen glass 21. When image reading device 10 is used as a flatbed scanner, a document may be placed on platen glass 21 and may be fixed by closing document cover 13. Then, image reading unit 14 may scan platen glass 21, thereby reading an image of the document.

An operation panel 22 may be positioned at the front of document table 11. Operation panel 22 may comprise one or more operation buttons and a liquid crystal display. Image reading device 10 may be operated by inputting commands through operation panel 22. Image reading device 10 may be connected to an external information device, e.g., a computer. When image reading device 10 is connected to an external information device, image reading device 10 may be operated by the commands input through the operation panel 22, and also by commands issued by the external information device, e.g., via a scanner driver.

Figure 2:
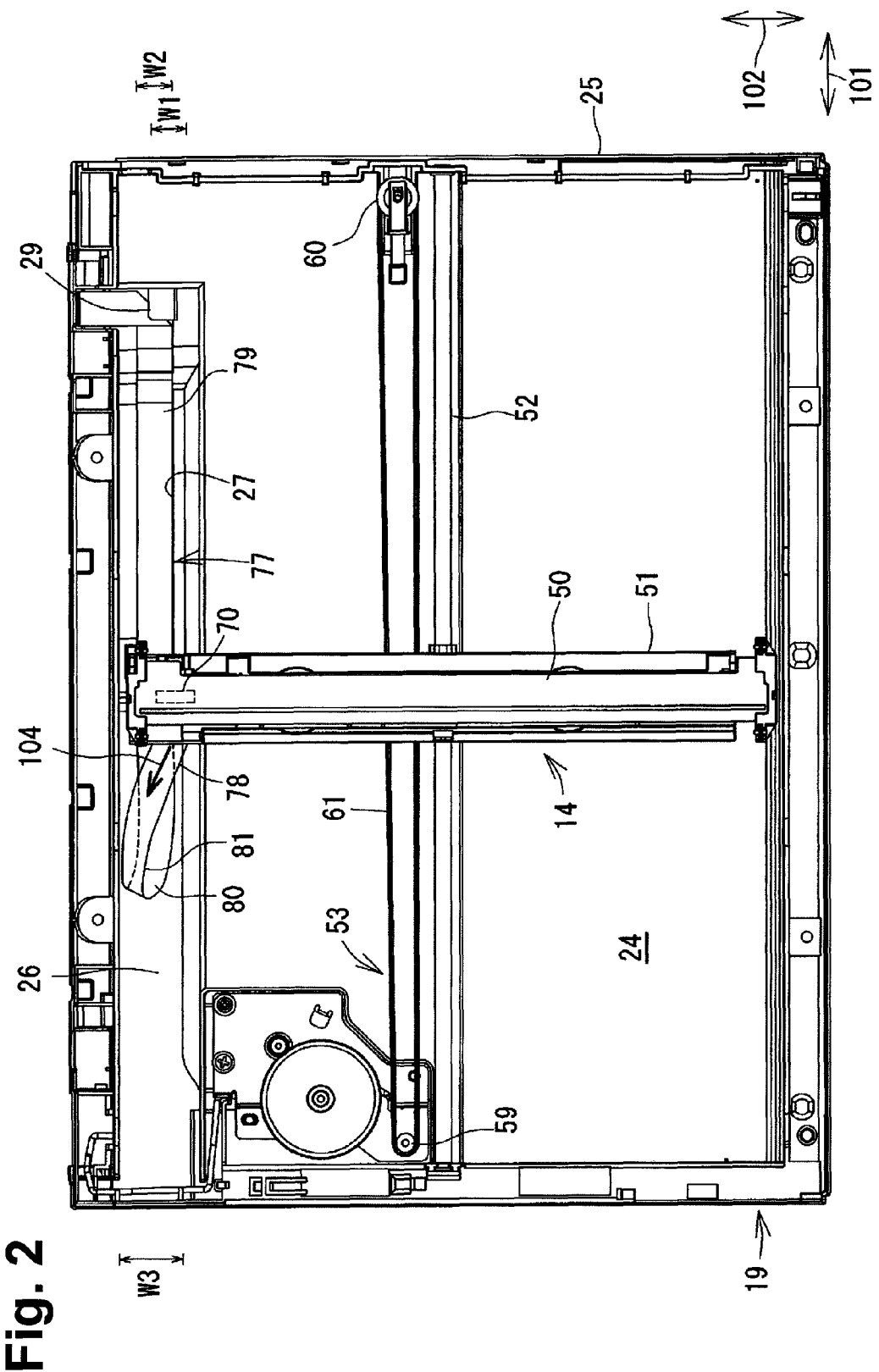
FIG. 2 is a top view showing the internal structure of a housing.

ADF 12 on document cover 13 successively may transport documents from a document tray to a paper output tray. While ADF 12 transports a document and the document passes over a platen 23, image reading unit 14 may read an image of the document from under platen 23. A more detailed description of the ADF 12 is omitted. Moreover, in an embodiment of the invention, ADF 12 may be omitted. Housing 20 of document table 11 may comprise an upper cover 18 and a lower frame 19. The center of upper cover 18 may be open, such that platen glass 21 may be exposed. As shown in FIG. 2, lower frame 19, which may have a substantially open-top box shape, may contain the image reading unit 14. Both lower frame 19 and upper cover 18 may comprise a resin.

Figure 3:
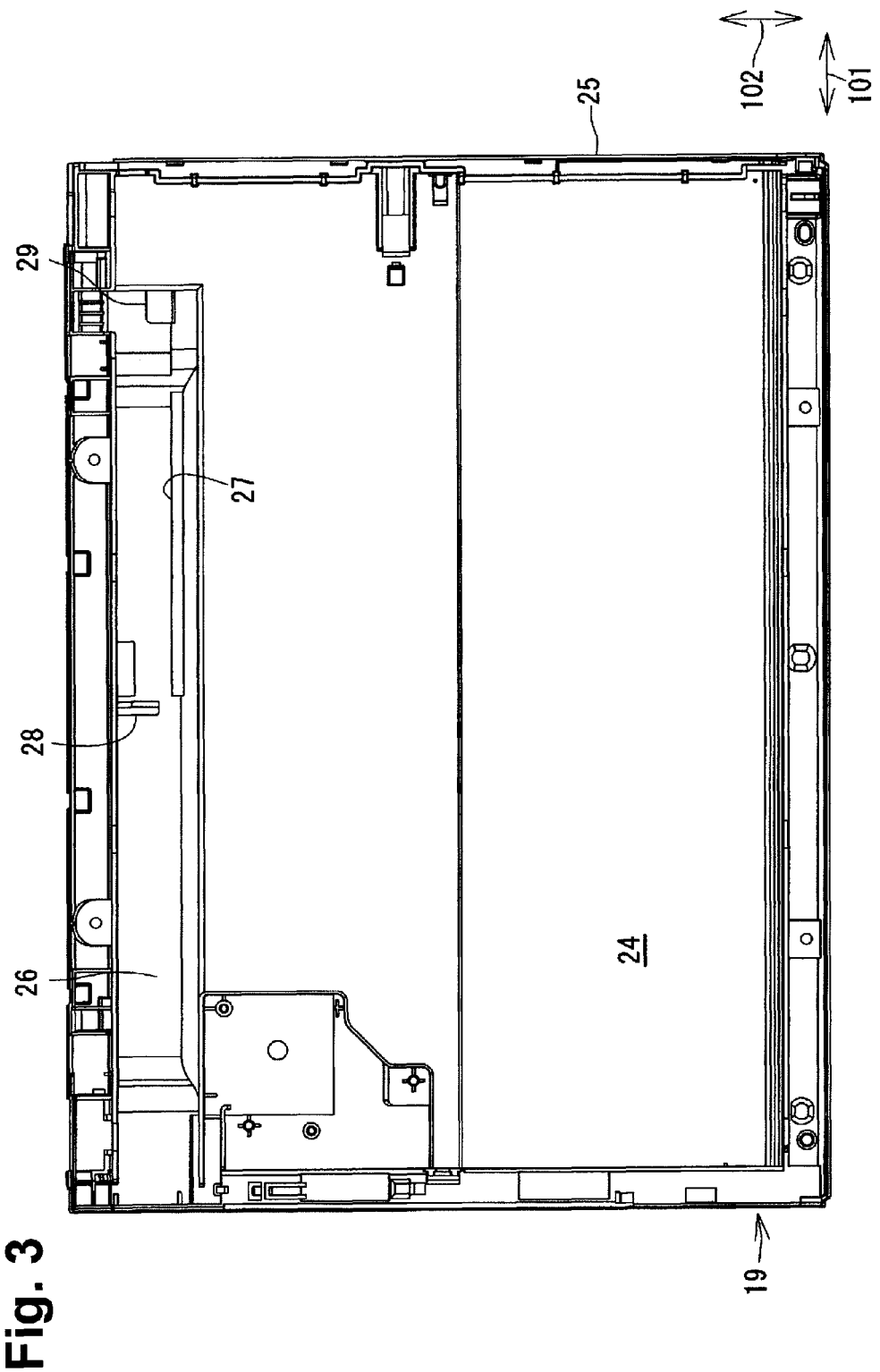
FIG. 3 is a top view showing the structure of a lower frame.

As shown in FIG. 3, lower frame 19 may comprise a base member 24 as a bottom panel and a side wall 25 standing substantially upright on the edge of base member 24. Lower frame 19 may have a substantially open-top box shape. A second surface, e.g., an inner surface 26 of base member 24 may be opposite and substantially parallel to a third surface, e.g., lower surface 17 of platen glass 21. The area of inner surface 26 above which an electric cable 77 may be positioned may be substantially parallel to lower surface 17 of platen glass 21. Nevertheless, not all areas of inner surface 26 may be parallel to lower surface 17 of platen glass 21.

Electric cable 77 may have a first end side 78 electrically connected to image sensor 50, and a second end side 79 connected to housing 20. In an embodiment of the invention, first end side 78 may not include the first end of electric cable 77, and second end side 79 may not include the second end of electric cable 77. In an embodiment of the invention, first end side 78 and the second end side 79 of the electric cable may refer to relative portions of the electric cable with respect to its length direction.

A guide wall 27 may stand substantially upright on the inner surface 26, near the back side of the base member 24, and may extend in a width direction, e.g., the direction shown by arrow 101. Guide wall 27, which may be substantially perpendicular to inner surface 26, may be formed near a region at which a second end side 79 of electric cable 77 is drawn out of the lower frame 19. The height of guide wall 27 may be greater than the thickness of electric cable 77.

Clips 28 and 29 may be positioned on base member 24 at positions substantially adjacent to ends of guide wall 27 in the width direction, e.g., the direction shown in arrow 101, of image reading device 10. Clips 28 and 29 may be positioned above inner surface 26 of base member 24, and may extend substantially in parallel to inner surface 26. The base ends of clips 28 and 29 may be fixed to base member 24, while the tips of clips 28 and 29 may not be fixed to any members, and may be free from inner surface 26. The distance between the inner surface 26 and clips 28 and 29 may be slightly greater than the thickness of electric cable 77. Thus, electric cable 77 may be inserted through the space between the tips of clips 28 and 29 and inner surface 26. Moreover, lower frame 19 may comprise a plurality of members, including support ribs for supporting the platen glass 21, bosses for screwing various components thereon, and through-holes for electrical wiring, depending on an embodiment of the invention. Detailed descriptions of such members are omitted.

As shown in FIG. 2, image reading unit 14 may comprise an image sensor 50, a carriage 51, a guide shaft 52, and a belt drive mechanism 53. Image sensor 50 may illuminate a document, photoelectrically convert light reflected by the document, and may output electric signals corresponding to light reflected by the document. In an embodiment of the invention, the image sensor is a contact image sensor. Belt drive mechanism 53 may correspond to a scanning mechanism in an embodiment of the invention. As shown in FIG. 2, belt drive mechanism 53 may comprise a drive pulley 59, a driven pulley 60, and timing belt 61. Drive pulley 59 and driven pulley 60 may be positioned near distal ends of guide shaft 52 in its axis direction, e.g., the direction shown in arrow 101. Timing belt 61, which may be an endless belt having teeth on its inner surface, may be looped over drive pulley 59 and driven pulley 60.

When rotation of a motor (not shown) is input to the axis of drive pulley 59, drive pulley 59 may rotates, such that drive pulley 59 rotates timing belt 61. Belt gripper portion 55 of the carriage may grip timing belt 61, which may allow carriage 51 to slide over guide shaft 52 while timing belt 61 rotates.

Carriage 51 may be fitted to guide shaft 52, which may extend in the width direction of lower frame 19. Belt drive mechanism 53 may drive carriage 51 to slide along the guide shaft 52. Carriage 51 may move along guide shaft 52, such that image sensor 50 on carriage 51 may contact platen glass 21, which may reciprocate image sensor 50 in a direction substantially parallel to platen glass 21.

Figure 4:
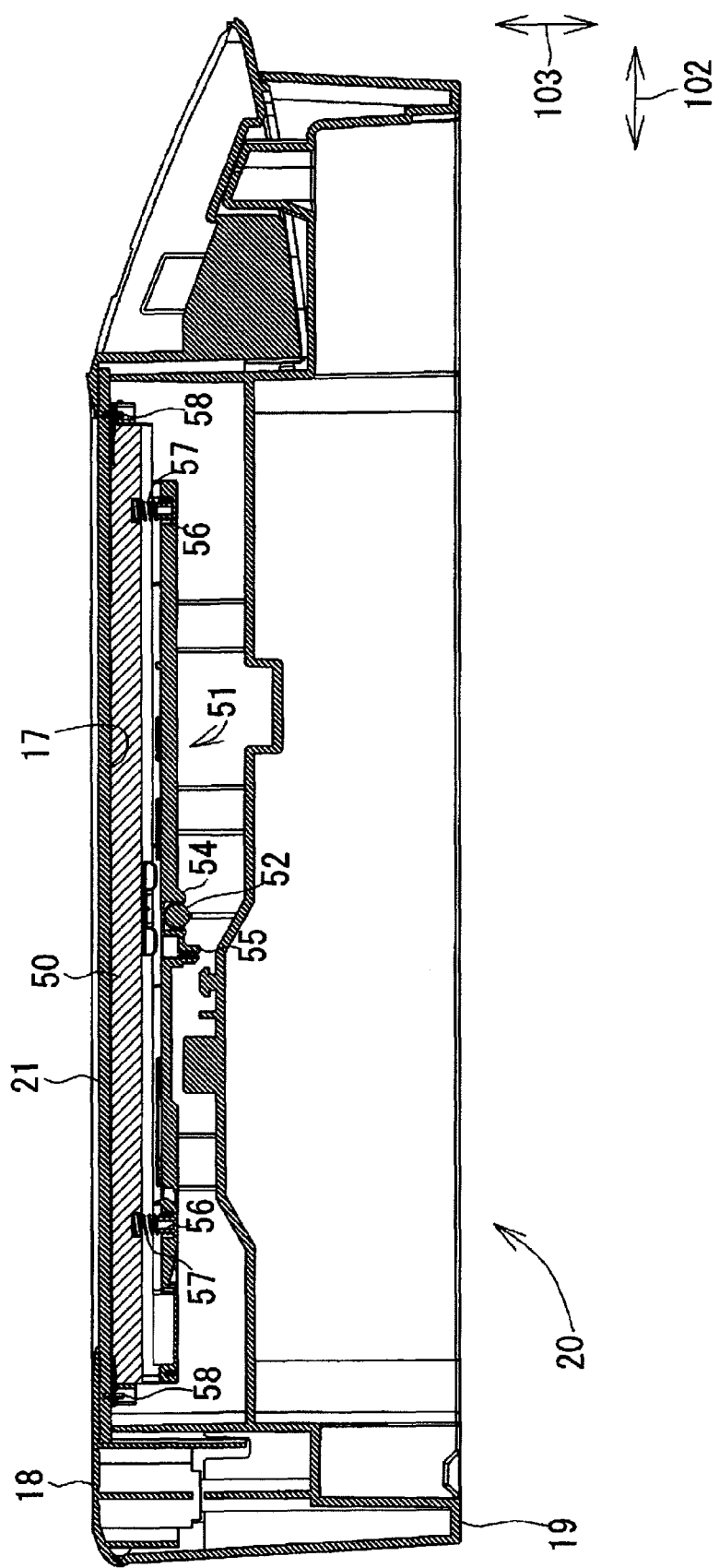
FIG. 4 is a sectional view showing the internal structure of the image reading device from which an electric cable is omitted.
Figure 5:
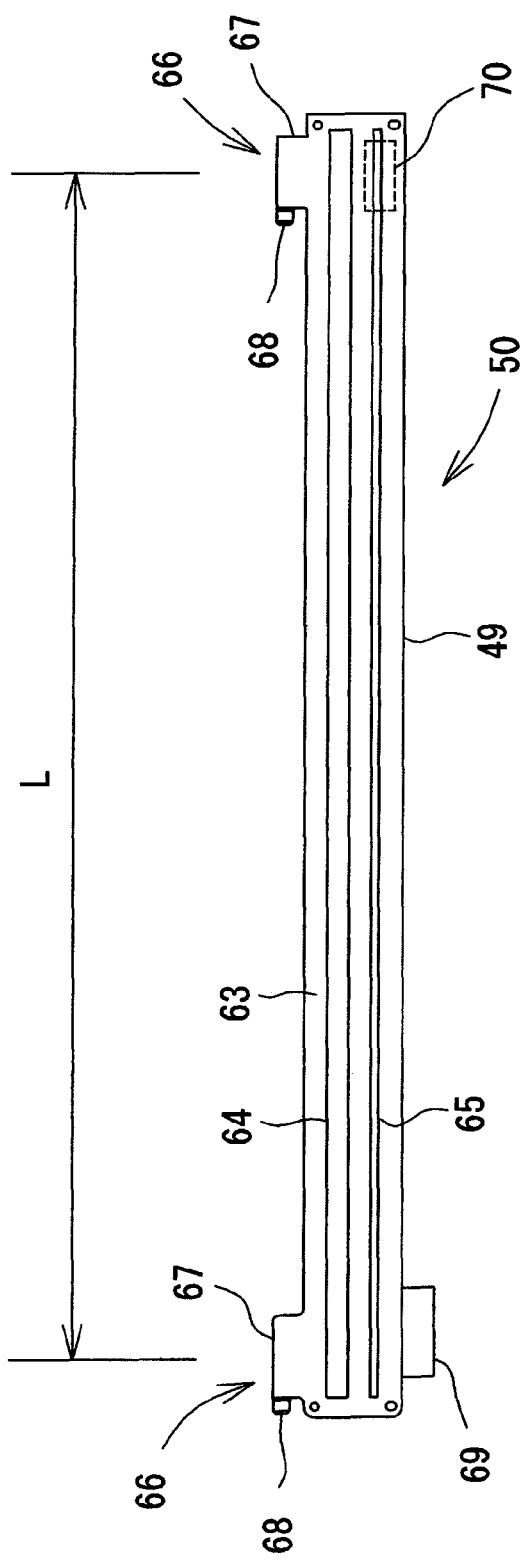
FIG. 5 is a top view showing the structure of an image sensor.

As shown in FIG. 5, image sensor 50 may comprise a housing 49, which may be mounted on carriage 51. Referring to FIG. 4, image sensor 50 may scan lower surface 17 of platen glass 21. The length direction of housing 49 may be a first direction, e.g., a main scanning direction, and may be shown by arrow 102. The width direction of housing 49 may be a second direction, e.g., a sub-scanning direction, and may be shown by arrow 101. Image sensor 50 may be supportively mounted on carriage 51. A shaft receiving portion 54 may be formed on the lower surface of carriage 51, and may be fitted to guide shaft 52 from above in a straddling manner. Shaft receiving portion 54 may be fitted to guide shaft 52, and carriage 51 may be supported by guide shaft 52 such that carriage 51 smoothly may slide in the axis direction of guide shaft 52.

A belt gripper portion 55 may protrude downward from a region of the lower surface of carriage 51 near shaft receiving portion 54. Belt gripper portion 55 may grip a timing belt 61 of belt drive mechanism 53, such that timing belt 61 connects to carriage 51. Thus, belt drive mechanism 53 may transmit a driving force to carriage 51, such that carriage 51 may reciprocate on guide shaft 52.

Inside carriage 51, spring receiving portions 56 may be positioned on each of the left and right sides of carriage 51. Coil springs 57, which may be positioned near spring receiving portions 56, may be positioned between image sensor 50 and carriage 51. Coil springs 57 may press image sensor 50 on carriage 51 against the lower surface of platen glass 21, such that image sensor 50 may contact the lower surface of platen glass 21. Rollers 58 may be positioned on both ends of image sensor 50. Image sensor 50 may be pressed against the lower surface of platen glass 21, with rollers 58 positioned therebetween. When image sensor 50 reciprocates together with carriage 51, rollers 58 may rotate in contact with the platen glass 21, such that the image sensor 50 may reciprocate smoothly.

As shown in FIG. 5, image sensor 50 may comprise housing 49, which may have a substantially box-shape. Upper surface 63 of housing 49 may have a substantially elongated rectangular shape in plan view. On upper surface 63 of housing 49, a light guide 64 may extend linearly in the length direction of housing 49, e.g., the left-right direction as shown in FIG. 5. Light guide 64 may guide light emitted by the LEDs inside housing 49. With light guide 64, light from the LEDs may be output toward upper surface 63 of housing 49 of image sensor 50. On upper surface 63 of housing 49, condensers 65 may be arranged linearly in the length direction of housing 49, parallel to light guide 64. Inside housing 49, and below condensers 65, photoelectric conversion elements may be arranged linearly, in the same direction as condensers 65. Light emitted by the LEDs may be incident on the medium to be read, and light that is reflected by the medium may be collected on the photoelectric conversion elements with condensers 65. The photoelectric conversion elements output electric signals in accordance with the intensity of the reflected light. In this way, image sensor 50, using a read line along its length, may output an image of the medium to be read as electric signals.

The direction of the read line of image sensor 50 may be the main scanning direction. The length of the read line of the image sensor may correspond to a maximum sized medium that can be read with image sensor 50. In an embodiment of the invention, image sensor 50 has a length large enough to read a Standard A4 size sheet, when the width direction of the sheet is in the main scanning direction. Specifically, in an embodiment of the invention, the length of image sensor 50 may be a few millimeters greater than 210 millimeters. The length of housing 49 may be a few centimeters greater than the length of the read line.

A read area L may be the maximum area of the read line of image sensor 50 that image reading device 10 effectively may use. Among electric signals read on the read line of image sensor 50, image reading device 10 may use data read in the read area L as image data. Electric signals output from a few photoelectric elements on the ends of the read line of image sensor 50 may not be used as image data. Therefore, the length of the read area L, e.g., the length of an arrow shown in FIG. 5, may be slightly smaller than the length of the read line. Although the data from the end portions of the read line may not be used as image data, image sensor 50 may be of a general purpose type, and may be applied to various other types of image reading devices.

Housing 49 of image sensor 50 may comprise two positioning portions 66. Positioning portions 66 may serve to position image sensor 50 in the sub-scanning direction relative to carriage 51. Each of positioning portions 66 may be positioned on one of the surfaces of housing 49 of image sensor 50 in its width direction. Each of positioning portions 66 may comprise a base 67, which may protrude from an end of the surface of the housing of image sensor 50 in its width direction, and a shaft 68 which may protrude from base 67 in the length direction of housing 49. Shafts 68 may be inserted in bearing portions 73 of carriage 51, as described below, and may the image sensor 50 in the sub-scanning direction. A protrusion 69 may be formed on the other surface of housing 49 of image sensor 50 in its width direction. Protrusion 69 may be fitted to a recess 76 of carriage 51, and may position image sensor 50 in the main scanning direction.

A connector 70 may be positioned on a first end of the bottom surface of housing 49 of image sensor 50 in the length direction. Connector 70 may be positioned on the bottom surface of housing 49 within the read area L described above. Connector 70 may be electrically connected to the LEDs and the photoelectric conversion elements of image sensor 50, and may send signals to and receive signals from the controller therethrough. Electric cable 77 may be connected to connector 70. Image sensor 50 may be electrically connected to the controller of image reading device 10 via electric cable 77.

Figure 6:
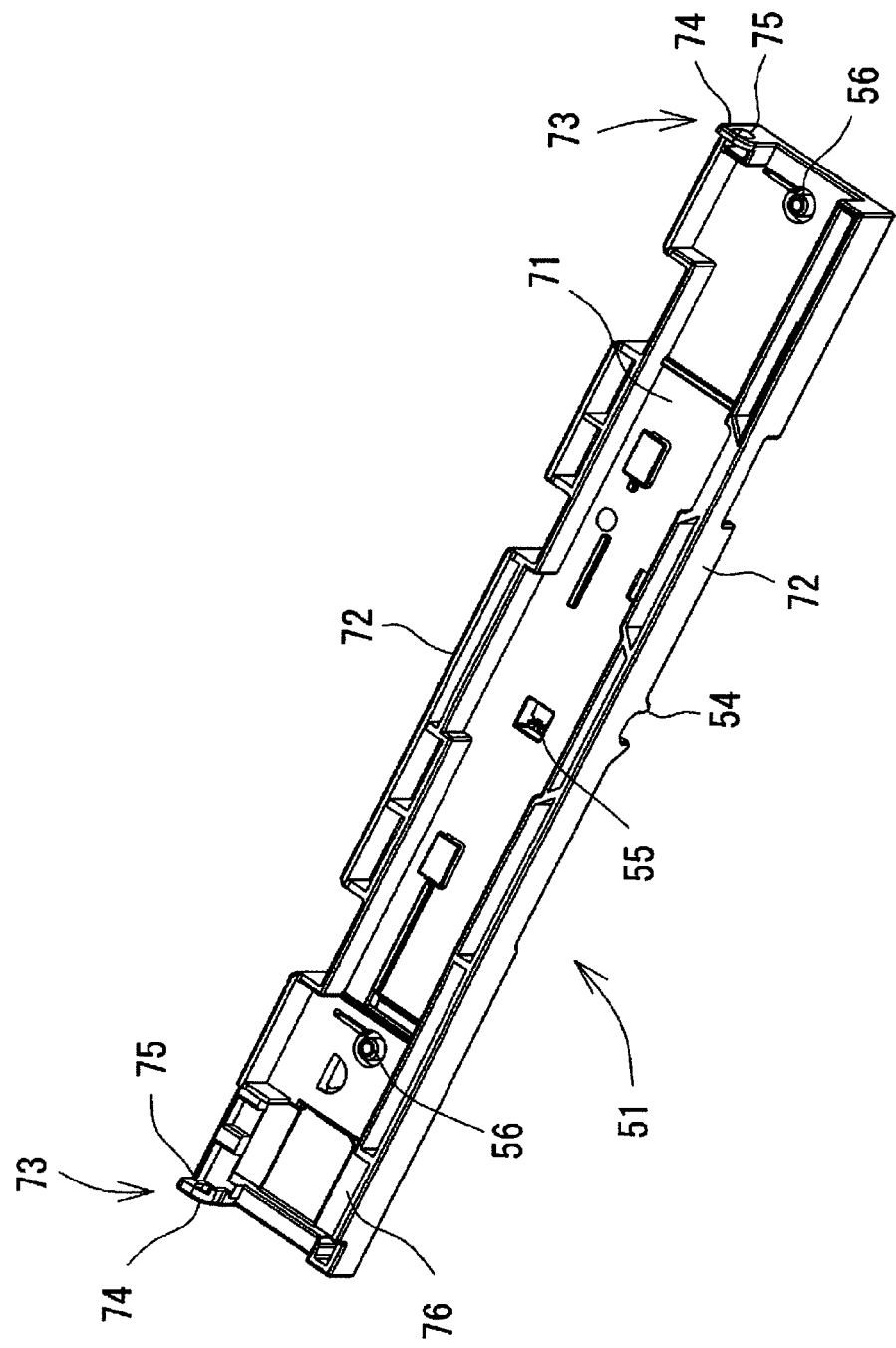
FIG. 6 is a perspective view showing a structure of a carriage.

As shown in FIG. 6, carriage 51 may be a substantially box-shaped member, and may hold image sensor 50. Carriage 51 may comprise a bottom portion 71, and walls 72 which may stand upright on edges of bottom portion 71 in the sub-scanning direction. Image sensor 50 may be installed in a space formed by bottom portion 71 and walls 72. Bearing portions 73 may be formed on one of walls 72. Shafts 68 of positioning portions 66 of image sensor 50 may be inserted into bearing portions 73. Each of bearing portions 73 may comprise a protruding piece 74 protruding from the corresponding wall 72, and may have a vertically elongated hole 75 extending therethrough. Shafts 68 of positioning portions 66 of image sensor 50 may be inserted in vertically elongated holes 75, such that positioning portions 66 may be engaged with the respective bearing portions 73. Bearing portions 73 may be positioned at positions corresponding to the respective positioning portions 66.

On the other one of walls 72 that does not have bearing portions 73 formed thereon, recess 76 may be formed such that recess 76 corresponds to a position of protrusion 69 of image sensor 50. Protrusion 69 of the image sensor 50 may engage with recess 76 such that image sensor 50 may be positioned in the main scanning direction relative to the carriage 51.

As shown in FIG. 2, electric cable 77 may be connected to connector 70 of image sensor 50. Electric cable 77 may comprise conductors for supplying electric power to the LEDs in the image sensor 50, conductors for outputting electric signals from the photoelectric conversion elements, and conductors for other purposes. The conductors may be arranged and insulation coated such that the conductors may form a strap-shaped cable. Electric cable 77, e.g., a flexible flat cable, may have a relatively thin elongated substantially strap shape, e.g., a relatively thin elongated shape having front and back surfaces of a substantially constant and predetermined width. Electric cable 77 may have front and back surfaces with a predetermined width and may extend in the length direction perpendicular to the width direction. A first end side 78 of electric cable 77 may be a portion of electric cable 77 having an end connected to connector 70. The first end side 78 may refer to a relative portion of the electric cable in the length direction, and may not necessarily correspond exactly to the first end of the cable.

Second end side 79 of electric cable 77 may be connected to the controller of image reading device 10. The controller (not shown) of image reading device 10 may comprise, for example, a CPU for performing various computations, a ROM for storing control programs, a RAM for temporarily storing data, and an ASIC for driving a driving circuit and various interfaces. Electric cable 77 may provide an electric signal path between image sensor 50 and the controller.

As shown in FIG. 2, first end side 78 of electric cable 77 may be fixed to carriage 51, and second end side 79 of electric cable 77 may be fixed to inner surface 26 of base member 24. First end side 78 of electric cable 77, extending from the connector 70 of the image sensor 50, may be attached to the bottom surface of carriage 51. Electric cable 77 may be fixed, e.g., attached, to the bottom surface of the carriage 51 in a manner such that the front and back surfaces of first end side 78 may be substantially horizontal. First end side 78 of electric cable 77 may be fixed to carriage 51 such that a third direction, e.g., length direction 104 as shown by an arrow in FIG. 2, may be oriented toward the outside of the read area L of image sensor 50. As shown in plan view of FIG. 2, length direction 104 of first end side 78 may intersect the main scanning direction and the sub-scanning direction.

Second end side 79 of electric cable 77 may be fixed, e.g., attached, to inner surface 26, and an edge of electric cable 77 in the width direction may contact guide wall 27. Electric cable 77 may be attached to inner surface 26 of base member 24 such that front and back surfaces of second end side 79 also may be substantially horizontal. In an embodiment of the invention, first end side 78 and second end side 79 of the electric cable 77 may be fixed, e.g., attached, to corresponding surfaces via a fixing member, e.g., pieces of double-sided adhesive tape. A position of the second end side 79 of the electric cable 77, at which an edge in the width direction extends along the guide wall 27 and one of the front and back surfaces extends along the inner surface 26, is referred to as a second position in the invention.

Second end side 79 of electric cable 77 may be positioned between clips 28 and 29 and inner surface 26. Second end side 79 of electric cable 77 may be fixed, e.g., attached, to inner surface 26 at portions corresponding to positions of clips 28 and 29. In an embodiment of the invention, each of clips 28 and 29 may correspond to a fixing member. As shown in FIG. 2, positions of first end side 78 and second end side 79 of electric cable 77 may be different relative to the main scanning direction, e.g., a direction of arrow 102 of image sensor 50. As shown in FIG. 2, first end side 78 may have a width W1, and second end side 79 may have a width W2. In an embodiment of the invention, first end side 78, having width W1, and second end side 79, having width W2, may not be positioned at the same position in the main scanning direction, e.g., in the direction of arrow 102. Electric cable 77, as shown in FIG. 2, is an image of electric cable 77 orthogonally projected on lower surface 17 of platen glass 21. In this projected image, width W1 of first end side 78 may be positioned closer to the center of image reading device 10 in the main scanning direction than width W2 of second end side 79.

A middle portion 80 of electric cable 77 may be between first end side 78 and second end side 79. Middle portion 80 may not be fixed to lower frame 19, and also may not be fixed to carriage 51. Middle portion 80 may be curved downward from first end side 78 to second end side 79, such that electric cable 77 may be positioned away from platen glass 21. The curve of middle portion 80 may be substantially U-shaped, when viewed from a rear side of lower frame 19. At the curve, electric cable 77 may reverse direction at the middle portion 80.

Electric cable 77 may be flexible, and may follow image sensor 50 as image sensor 50 reciprocates, while middle portion 80 changes its position. Electric cable 77 may have a high resilience which may allow the curved middle portion 80 to return to its original linear shape. With the resilience, the curved middle portion 80 may expand vertically inside housing 20 and may contact inner surface 26 of lower frame 19 and lower surface 17 of platen glass 21. Referring to FIG. 2, the curvature of middle portion 80 may become larger as carriage 51 moves toward the right side. Similarly, the curvature of middle portion 80 may become smaller as the carriage moves toward the left side. When housing 20 has a low profile, middle portion 80 of electric cable 77 may contact lower surface 17 of platen glass 21 for the entire reciprocation range of carriage 51.

As described above, length direction 104 of first end side 78 of the electric cable 77 may be oriented toward an outside of the read area L. Moreover, positions of first end side 78 and second end side 79 may be different relative to the main scanning direction of image sensor 50. Specifically, second end side 79 may be oriented in the sub-scanning direction (arrow 101). With such a structure, middle portion 80 of electric cable 77 may be curved, e.g., reverse direction, as described above, and may twist, such that the front and back surfaces of the strap-shaped electric cable 77 may not become parallel to lower surface 17 of platen glass 21, e.g., electric cable 77 may be at a first position.

Electric cable 77 may not have a surface contact with lower surface 17 of the platen glass 21 when electric cable 77 is in the first position, as described above. Moreover, electric cable 77 may not contact the same surface over the entire width of electric cable 77. Rather, electric cable 77 may contact lower surface 17 at an edge 81 that may be at substantially the center of the read line, among a pair of edges in the width direction. With this structure, the amount of friction generated when electric cable 77 slides over platen glass 21 so as to follow carriage 51, may be reduced.

Figure 7:
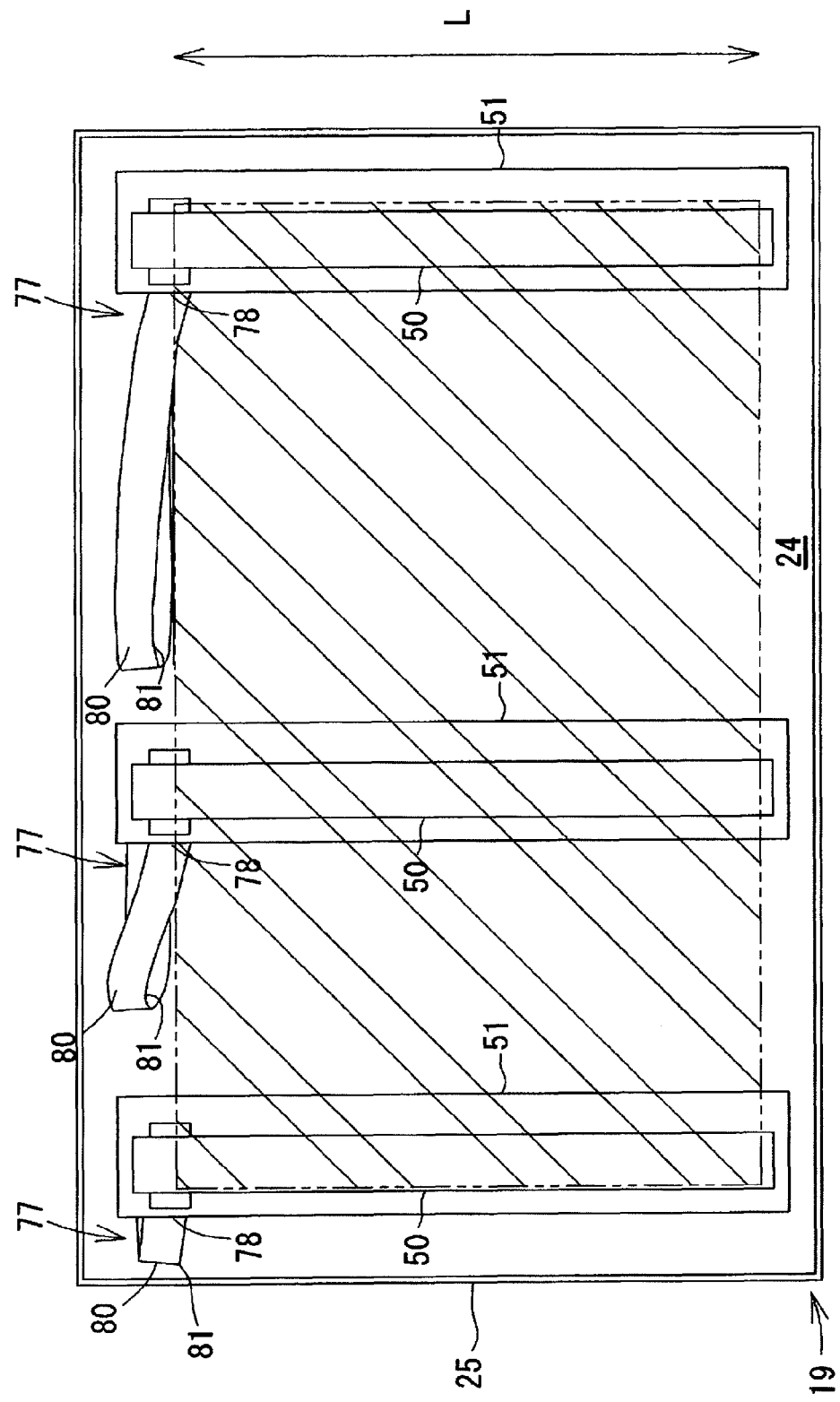
FIG. 7 is a schematic view showing the states of the electric cable corresponding to movements of the carriage.

As shown in FIG. 7, first end side 78 of electric cable 77 may be positioned toward the outside of the read area L, and edge 81 of middle portion 80 also may be positioned outside the read area L while carriage 51 reciprocates. As carriage 51 reciprocates, the area of middle portion 80 of electric cable 77 that contacts lower surface 17 of platen glass 21 may change, specifically in the length direction of electric cable 77. Because middle portion 80 may continue to be twisted as carriage 51 reciprocates, edge 81 of middle portion 80 may maintain contact with lower surface 17 of platen glass 21. Thus, middle portion 80 of electric cable 77 may contact lower surface 17 of platen glass 21 in an area outside the read area L, regardless of the reciprocation position of the carriage 51.

The twist of middle portion 80 may generate a reaction force. This force may move the second end side 79 in a direction other than the sub-scanning direction, or slightly may change an orientation of first end side 78 extending from carriage 51 with respect to length direction 104. Nevertheless, as shown in FIG. 2, the edge of second end side 79 of electric cable 77 may be positioned along guide wall 27, and second end side 79 may maintain a position extending in the sub-scanning direction throughout the entire reciprocating range of the carriage 51. Thus, the position of electric cable 77 inside housing 20 may be accurately determined throughout the entire reciprocating range of the carriage 51. That is, as shown in FIG. 2, the position of electric cable 77 may be limited within width W3 in the main scanning direction of the image sensor 50, regardless of the position of carriage 51.

At least one of the front and back surfaces of second end side 79 of electric cable 77 may extend along inner surface 26 of lower frame 19, and a resilience of electric cable 77 may allow the curved middle portion 80 to return to a substantially linear shape. This structure may allow middle portion 80 to maintain a twisted position. Thus, buckling or other unwanted deformations of electric cable 77 due to contact with lower surface 17 of platen glass 21 may be reduced. Moreover, the position of the electric cable 77 smoothly may change in accordance with the reciprocation of carriage 51, and friction generated when electric cable 77 slides over lower surface 17 of platen glass 21 may be reduced.

The position of electric cable 77 within housing 20 may be determined for the entire reciprocation range of the carriage 51. Thus, in an embodiment of the invention, other structures or components may be positioned adjacent to electric cable 77 within housing 20. Moreover, middle portion 80 of electric cable 77 may contact lower surface 17 of platen glass 21 in an area outside the read area L. Thus, a read image may not deteriorate even if such contact may smudge or scratch platen glass 21.

First end side 78 of electric cable 77 may be stuck, e.g., fixed to the bottom surface of carriage 51, and electric cable 77 also may be fixed. Guide wall 27 may maintain the position in which second end side 79 extends in the sub-scanning direction, even when the length direction 104 of the first end side 78 extending from the carriage 51 is changed. Thus, the area in which the electric cable 77 moves to follow carriage 51 may be determined even when the position of the first end side 78 of the electric cable 77 is not precisely determined.

Figure 8:
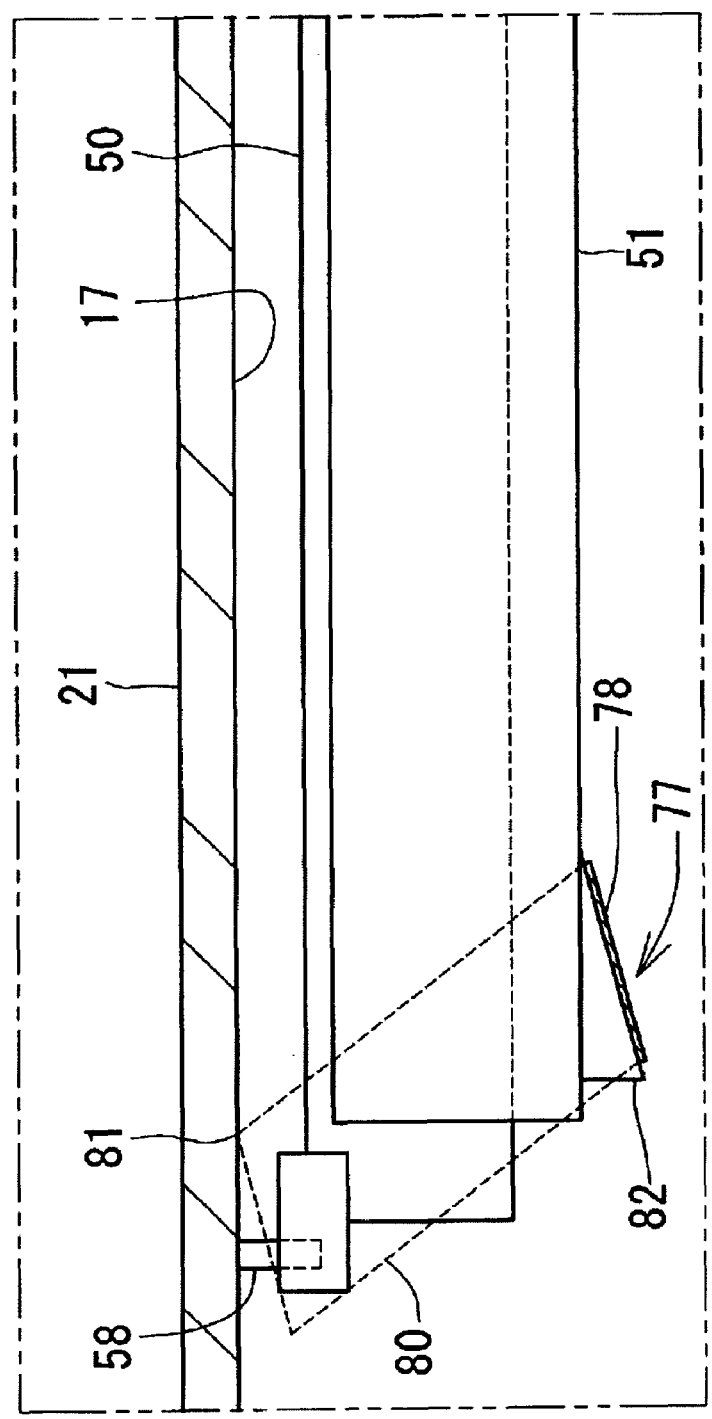
FIG. 8 is a sectional view showing a region surrounding a first end side of the electric cable according to a modification of the embodiment.

In another embodiment of the invention, as shown in FIG. 8, a wedge-shaped base 82 may be positioned on the bottom surface of carriage 51, such that the lower surface of base 82 may descend toward the edge of carriage 51. First end side 78 of electric cable 77 may be attached, e.g., stuck, to base 82. In this embodiment, first end side 78 of electric cable 77 may not become parallel to lower surface 17 of platen glass 21. Thus, in this embodiment, the middle portion 80 may twist, and the electric cable 77 may contact lower surface 17 of platen glass 21 at edge 81.

In an embodiment of the invention, middle portion 80 of electric cable 77 may contact lower surface 17 of platen glass 21. Nevertheless, in another embodiment of the invention, middle portion 80 of electric cable 77 may contact the inner surface of lower frame 19 of housing 20, instead of platen glass 21. In yet another embodiment, middle portion 80 the electric cable 77 may not directly contact platen glass 21 or lower frame 19, but may be coupled to platen glass 21 or lower frame 19 via a thin member, e.g., a contact sheet.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. An image reading device, comprising:
    a housing comprising a first surface, a second surface, and a third surface parallel to the first surface, the third surface extending between the first surface and the second surface;
    a transparent panel configured to have a document placed thereon, the transparent panel defining at least a portion of the first surface of the housing;
    an image sensor extending in a first direction and configured to optically read the document through the transparent panel;
    a carriage having the image sensor mounted thereon and configured to reciprocate along the transparent panel in a second direction perpendicular to the first direction; and
    an electric cable connected to the image sensor, the electric cable comprising:
        a first portion extending from the image sensor in a third direction oblique to the first direction and the second direction, the third direction comprising a component projecting along the first direction away from the image sensor;
        a second portion extending along the second surface; and
        a third portion between the first portion and the second portion, the third portion being twisted with respect to the first portion and the second portion.

2. The image reading device according to claim 1, wherein the third portion is configured to curve, such that the electric cable is reversed.

3. The image reading device according to claim 1, further comprising a guide wall extending upward from the second surface of the housing,
    wherein the guide wall extends along the second direction and is configured to guide the third portion of the electric cable.

4. The image reading device according to claim 1, further comprising an attachment member configured to attach the second portion of the electric cable to the housing along the second surface of the housing.

5. The image reading device according to claim 2,
wherein the image sensor comprises a read area, and
wherein the third portion of the electric cable contacts one of an inner surface of the housing and the third surface of the housing, at a position outside of the read area of the image sensor.

6. The image reading device according to claim 1, wherein the first portion and the second portion are positioned at different positions in the first direction as viewed from the direction perpendicular to the transparent panel.

7. The image reading device according to claim 1,
wherein the image sensor comprises a read area, and
wherein the first portion of the electric cable is attached to the carriage, such that the first portion of the electric cable extends in a direction oriented toward an outside of the read area of the image sensor, as viewed from the direction perpendicular to the transparent panel.

8. The image reading device according to claim 1, wherein the carriage comprises a wedge-shaped base positioned on a bottom surface of the carriage, such that a lower surface of the wedge-shaped base extends toward an edge of the carriage and toward the second surface.

9. The image reading device according to claim 8, wherein the first portion of the electric cable is attached to the wedge-shaped base.

10. The image reading device according to claim 1, wherein the image sensor is a contact image sensor.

11. The image reading device according to claim 1, wherein the housing has a hexahedral shape having a low profile, and the first surface is an upper face of the hexahedral shape.

12. The image reading device according to claim 4, wherein the attachment member comprises a double-sided adhesive tape configured to attach the second portion of the electric cable to the second surface of the housing.

13. The image reading device according to claim 4, wherein the attachment member comprises a clip configured to clip the second portion of the electric cable and to attach the electric cable to the second surface of the housing.

14. The image reading device according to claim 1, wherein the electric cable comprises an edge, and the transparent panel guides the edge of the electric cable.

15. The image reading device according to claim 14, wherein the third portion is configured to curve, such that the electric cable is reversed, and wherein the transparent panel guides the third portion of the electric cable which includes comprises the edge.

16. The image reading device according to claim 1, wherein the housing further comprises a frame, and wherein the third portion of the electric cable contacts an inner surface of the frame.

17. The image reading device according to claim 1, wherein the first portion extends from the image sensor in the third direction, such that the third portion contacts the third surface only at an edge thereof.

* * * * *